United States Patent
Suzumori et al.

(10) Patent No.: US 7,297,282 B2
(45) Date of Patent: *Nov. 20, 2007

(54) FLUID FILTER, DRAIN MECHANISM THEREOF, DRAINING JIG USED IN FLUID FILTER AND DRAINING METHOD OF FLUID FILTER

(75) Inventors: Kiichiro Suzumori, Kariya (JP); Toshihiro Takahara, Kariya (JP); Sadahito Fukumori, Kariya (JP); Ryuichiro Kamioka, Toyota (JP); Jin Hashioka, Toyota (JP); Kenzo Kado, Toyota (JP)

(73) Assignees: Toyoda Boshoku Corporation, Kariya-shi (JP); Toyota Jidosha Kabushiki Kaisha, Toyota-shi (JP); Denso Corporation, Kariya-shi (JP)

( * ) Notice: Subject to any disclaimer, the term of this patent is extended or adjusted under 35 U.S.C. 154(b) by 280 days.

This patent is subject to a terminal disclaimer.

(21) Appl. No.: 10/704,545

(22) Filed: Nov. 12, 2003

(65) Prior Publication Data

US 2004/0144734 A1 Jul. 29, 2004

(30) Foreign Application Priority Data

Nov. 12, 2002 (JP) .............................. 2002-328803

(51) Int. Cl.
*B01D 35/16* (2006.01)
*B01D 35/34* (2006.01)

(52) U.S. Cl. ................. 210/767; 210/167.02; 210/248; 210/DIG. 17; 123/196 A (58) Field of Classification Search ................ 210/767, 210/168, 172, 248, DIG. 17
See application file for complete search history.

(56) References Cited

U.S. PATENT DOCUMENTS

| | | | |
|---|---|---|---|
| 3,069,015 A * | 12/1962 | Hultgren et al. ............. | 210/232 |
| 3,861,646 A * | 1/1975 | Douglas ...................... | 251/356 |
| 4,196,886 A * | 4/1980 | Murray ........................ | 251/357 |
| 4,375,864 A * | 3/1983 | Savage ......................... | 222/81 |

(Continued)

FOREIGN PATENT DOCUMENTS

| | | |
|---|---|---|
| DE | 199 60 203 | 6/2001 |
| JP | 57-55894 | 4/1982 |
| JP | 61-155614 | 9/1986 |
| JP | 4-79911 | 7/1992 |

(Continued)

OTHER PUBLICATIONS

K. Sugimoto, et al., Cell Structure and Function, vol. 25, pp. 253-261, "Centromere/Kinetochore Localization of Human Centromere Protein A (CENP-A) Exogenously Expressed as a Fusion to Green Fluorescent Protein", 2000.

K. Sugimoto, et al., Cell Structure and Function, vol. 26, pp. 705-718, "Molecular Behavior in Living Mitotic Cells of Human Centromere Heterochromatin Protein HP1αEctopically Expressed as a Fusion to Red Fluorescent Protein", 2001.

*Primary Examiner*—Robert James Popovics
*Assistant Examiner*—T. Woodruff
(74) *Attorney, Agent, or Firm*—Oblon, Spivak, McClelland, Maier & Neustadt, P.C.

(57) ABSTRACT

The invention provides a drain mechanism of a fluid filter in which a heated fluid is not splashed on a worker at a time of discharging the fluid such as a time of exchanging an element, and can inhibit dusts or the like from being mixed from an external portion at a time of normal use. A drain mechanism 7 of the present invention is provided with a cap 3 engaged with a case 2 and having a drain hole 15, a drain member (a drain plug 20) detachably mounted to the cap from an outer side thereof and closing the drain hole, a valve member 25 provided in an inner side of the cap and closing the drain hole, and an elastic means (a spring 11) for energizing the valve member in a direction of closing the drain hole. In a state in which the drain member is detached from the cap, a residual fluid within a housing is discharged by a tubular draining jig 30 inserted to the drain hole.

13 Claims, 4 Drawing Sheets

U.S. PATENT DOCUMENTS

| | | | | |
|---|---|---|---|---|
| 4,544,385 A * | 10/1985 | Tanaka | 96/114 |
| 4,581,135 A * | 4/1986 | Gerulis | 210/108 |
| 4,655,801 A * | 4/1987 | Kojima et al. | 96/137 |
| 4,673,419 A * | 6/1987 | Kojima | 96/144 |
| 4,713,094 A * | 12/1987 | Yanagawa et al. | 96/147 |
| 4,892,569 A * | 1/1990 | Kojima | 96/113 |
| 4,906,365 A * | 3/1990 | Baumann et al. | 210/238 |
| 4,951,723 A * | 8/1990 | Hoeptner, III | 141/351 |
| 5,049,269 A * | 9/1991 | Shah | 210/234 |
| 5,098,559 A * | 3/1992 | Mack et al. | 210/130 |
| 5,250,176 A * | 10/1993 | Daniel | 210/130 |
| 5,286,283 A * | 2/1994 | Goodell | 96/113 |
| 5,322,624 A * | 6/1994 | Rogers et al. | 210/232 |
| 5,334,230 A * | 8/1994 | Sloka | 96/113 |
| 5,366,400 A * | 11/1994 | Kucik | 440/88 L |
| 5,431,588 A * | 7/1995 | Kucik | 440/88 L |
| 5,447,627 A * | 9/1995 | Loafman et al. | 210/316 |
| 5,468,386 A * | 11/1995 | Ardes | 210/248 |
| 5,516,425 A * | 5/1996 | Brieden et al. | 210/232 |
| 5,520,801 A * | 5/1996 | Gerber et al. | 210/130 |
| 5,538,626 A * | 7/1996 | Baumann | 210/130 |
| 5,546,979 A * | 8/1996 | Clark et al. | 137/318 |
| 5,546,986 A * | 8/1996 | Clark et al. | 137/614.05 |
| 5,547,565 A * | 8/1996 | Biere et al. | 210/86 |
| 5,603,829 A * | 2/1997 | Baumann | 210/295 |
| 5,606,989 A * | 3/1997 | Roll et al. | 137/203 |
| 5,609,195 A * | 3/1997 | Stricklin et al. | 141/346 |
| 5,630,570 A * | 5/1997 | Lacroix et al. | 251/149.9 |
| 5,667,699 A * | 9/1997 | Schlise | 210/800 |
| 5,688,396 A * | 11/1997 | Baumann et al. | 210/130 |
| 5,695,633 A * | 12/1997 | Ernst et al. | 210/130 |
| 5,738,785 A * | 4/1998 | Brown et al. | 210/232 |
| 5,744,030 A * | 4/1998 | Reid et al. | 210/235 |
| 5,779,900 A * | 7/1998 | Holm et al. | 210/411 |
| 5,814,215 A * | 9/1998 | Bruss et al. | 210/130 |
| 5,876,600 A * | 3/1999 | Matsubara et al. | 210/443 |
| 5,888,384 A * | 3/1999 | Wiederhold et al. | 210/130 |
| 5,902,479 A * | 5/1999 | Fukumori et al. | 210/248 |
| 5,922,196 A * | 7/1999 | Baumann | 210/232 |
| 5,928,511 A * | 7/1999 | Messner et al. | 210/248 |
| 5,988,705 A * | 11/1999 | Norkey | 285/319 |
| 6,012,485 A * | 1/2000 | Connelly et al. | 137/558 |
| 6,016,923 A * | 1/2000 | Baumann | 210/440 |
| 6,032,926 A * | 3/2000 | Fuchs | 251/149.4 |
| 6,062,537 A * | 5/2000 | Chih | 251/149.6 |
| 6,083,381 A * | 7/2000 | Connelly et al. | 210/86 |
| 6,090,283 A * | 7/2000 | Schumann et al. | 210/130 |
| 6,092,570 A * | 7/2000 | Densel et al. | 141/353 |
| 6,234,274 B1 * | 5/2001 | van der Griendt | 184/105.3 |
| 6,258,269 B1 | 7/2001 | Knight | |
| 6,267,875 B1 * | 7/2001 | Leo | 210/90 |
| 6,284,130 B1 * | 9/2001 | Daniel | 210/136 |
| 6,358,416 B1 * | 3/2002 | Miller et al. | 210/248 |
| 6,485,637 B2 * | 11/2002 | Jainek et al. | 210/130 |
| 6,488,845 B1 * | 12/2002 | Neufeld et al. | 210/232 |
| 6,533,935 B2 * | 3/2003 | Miller et al. | 210/248 |
| 6,558,536 B2 * | 5/2003 | Jainek et al. | 210/184 |
| 6,569,326 B1 * | 5/2003 | Baumann et al. | 210/232 |
| 6,572,768 B1 * | 6/2003 | Cline et al. | 210/236 |
| 6,591,807 B1 * | 7/2003 | Ardes | 123/198 R |
| 6,610,203 B1 * | 8/2003 | Jainek | 210/248 |
| 6,644,624 B2 * | 11/2003 | Jainek | 251/149.6 |
| 6,655,498 B1 * | 12/2003 | Sasa et al. | 184/1.5 |
| 6,685,829 B1 * | 2/2004 | Baumann et al. | 210/232 |
| 6,706,181 B1 * | 3/2004 | Baumann et al. | 210/236 |
| 6,790,356 B2 * | 9/2004 | Wright et al. | 210/248 |
| 6,866,122 B2 * | 3/2005 | Brozovic | 184/1.5 |
| 6,872,304 B1 * | 3/2005 | Gebert | 210/232 |
| 6,881,328 B2 * | 4/2005 | Dittmann et al. | 210/86 |
| 6,896,803 B2 * | 5/2005 | Cline et al. | 210/248 |
| 6,902,038 B2 * | 6/2005 | Takahara | 184/1.5 |
| 6,921,479 B2 * | 7/2005 | Ardes | 210/232 |
| 6,926,825 B2 * | 8/2005 | Ardes | 210/232 |
| 6,936,161 B2 * | 8/2005 | Wright et al. | 210/97 |
| 6,936,169 B2 * | 8/2005 | Baumann et al. | 210/497.01 |
| 6,949,182 B2 * | 9/2005 | Yano et al. | 210/130 |
| 6,953,019 B2 * | 10/2005 | Lee | 123/196 R |
| 6,960,296 B2 * | 11/2005 | Morita | 210/234 |
| 6,974,120 B2 * | 12/2005 | Wilson et al. | 251/129.21 |
| 7,008,472 B2 * | 3/2006 | Fornof et al. | 96/136 |
| 7,029,575 B1 * | 4/2006 | Baumann et al. | 210/130 |
| 7,060,184 B2 * | 6/2006 | Cline et al. | 210/248 |
| 7,134,641 B2 * | 11/2006 | Jensen et al. | 251/149.8 |
| 7,141,166 B2 * | 11/2006 | Sugiura et al. | 210/234 |
| 7,182,864 B2 * | 2/2007 | Brown et al. | 210/232 |
| 2001/0025812 A1 * | 10/2001 | Jainek et al. | 210/184 |
| 2002/0020660 A1 * | 2/2002 | Jainek et al. | 210/435 |
| 2002/0036163 A1 * | 3/2002 | Miller et al. | 210/248 |
| 2002/0104980 A1 * | 8/2002 | Janiek | 251/149.6 |
| 2002/0108897 A1 * | 8/2002 | Pavlin et al. | 210/248 |
| 2002/0134726 A1 * | 9/2002 | Ardes | 210/440 |
| 2003/0070876 A1 * | 4/2003 | Takahara | 184/1.5 |
| 2003/0098269 A1 * | 5/2003 | Ardes | 210/232 |
| 2003/0150787 A1 * | 8/2003 | Morita | 210/234 |
| 2003/0173281 A1 * | 9/2003 | Wright et al. | 210/248 |
| 2004/0035766 A1 * | 2/2004 | Wright et al. | 210/109 |
| 2004/0094464 A1 * | 5/2004 | Baumann et al. | 210/248 |
| 2004/0144734 A1 * | 7/2004 | Suzumori et al. | 210/767 |
| 2005/0072396 A1 * | 4/2005 | Lee | 123/196 R |
| 2005/0077253 A1 * | 4/2005 | Sugiura et al. | 210/767 |
| 2005/0218048 A1 * | 10/2005 | Kato | 210/130 |
| 2005/0230300 A1 * | 10/2005 | Kato | 210/234 |
| 2006/0054402 A1 * | 3/2006 | Dorian | 184/1.5 |
| 2006/0180541 A1 * | 8/2006 | Hueppchen et al. | 210/450 |

FOREIGN PATENT DOCUMENTS

| JP | 7-30307 | 6/1995 |
| JP | 7-38604 | 7/1995 |
| JP | 9-173716 | 7/1997 |
| JP | 9-290108 | 11/1997 |
| JP | 11-104408 | 4/1999 |
| JP | 11-294135 | 10/1999 |
| JP | 2000-42309 | 2/2000 |

* cited by examiner

FLUID FILTER, DRAIN MECHANISM THEREOF, DRAINING JIG USED IN FLUID FILTER AND DRAINING METHOD OF FLUID FILTER

BACKGROUND OF THE INVENTION

1. Field of the Invention

The present invention relates to a fluid filter, a drain mechanism thereof, a draining jig used in the fluid filter and a draining method of the fluid filter. The present invention more particularly relates to a fluid filter, a drain mechanism thereof, a draining jig used in the fluid filter and a draining method of the fluid filter, in which a heated fluid is not splashed on a worker at a time of discharging the fluid such as a time of exchanging an element, and can maintain a high reliability in sealing a drain hole for a long time period while inhibiting dusts or the like from being mixed from an external portion at a time of normal use.

The present invention can be widely used, for example, in an oil filter for filtering foreign materials, abraded powders, carbon and the like mixed in an oil lubricating an internal combustion engine, a fuel filter and a field relevant thereto.

2. Description of Prior Art

Conventionally, as a fluid filter, there has been generally known, for example, an element replacement type fluid filter in which a filter element is replaced at a time when a filter media is clogged after a predetermined time has passed and reaches a service life.

As a drain mechanism of the element replacement type fluid filter, there has been known, for example, a structure in which a drain member (a drain plug 15) is screwed with a drain hole formed in a cap (a lower case 12) (refer to a patent document 1). Accordingly, it is possible to detach the drain member from the drain hole by loosening the drain member so as to leave open the drain hole prior to separating the case and the cap by canceling the engagement between both the elements, thereby discharging a residual oil in an inner portion of the housing from the drain hole.

In this case, in the fluid filter for filtering an engine oil for a vehicle, an engine is frequently warmed up at a time of replacing the filter element, and the oil is in a heated state.

However, in the conventional drain mechanism, discharging the residual oil at a time of replacing the filter element is performed by detaching the drain member from the cap. In other words, at the same time when the drain member is loosened, and a sealing of a seal member (a packing 15a) for the drain member is cancelled, discharging the residual oil is started. As a result, there is generated a disadvantage that the heated residual oil overflows during a detaching operation of the drain member, and is splashed on hands of the worker.

Consequently, as the conventional drain mechanism of the fluid filter for solving the problem mentioned above, there has been known, for example, a structure in which a tubular drain pipe member (a drain plug 15) having a drain passage (a center hole 15g and a window hole 15f) is screwed with a drain hole formed in a cap (a lower case 12) (refer to a patent document 2).

The drain passage of the drain pipe member and the inner portion of the housing are sealed by a pair of seal members (the packing 15g) attached to an outer periphery of the drain pipe member, at a time of normally using the fluid filter. Further, when replacing the filter element, the sealing of the upper seal member is cancelled by loosening the drain pipe member, the drain passage of the drain pipe member and the inner portion of the housing are communicated with each other, and the residual oil within the housing is discharged via the drain passage.

Since the residual oil is discharged via the drain passage of the drain pipe member in the manner mentioned above, it is possible to prevent the oil in the middle of the discharging from being splashed on the hands of the worker.

In this case, when the seal of the upper seal member is cancelled by loosening the drain pipe member, the seal of the lower seal member is maintained, so that the residual oil does not leak out from the other portions than the drain passage of the drain pipe member at a time of discharging the residual oil.

Patent Document 1

Japanese Unexamined Patent Publication No. 2000-42309

Patent Document 2

Japanese Unexamined Patent Publication No. 11-104408

However, in the drain mechanism of the conventional fluid filter, since the drain pipe member is formed in the hollow shape and is structured such as to have the drain passage, dusts or the like such as sediments or mud or the like is mixed into the inner portion of the cap through the drain passage of the drain pipe member from the external portion, during a normal use of the fluid filter, so that it is hard to secure a reliability of seal in the drain hole achieved by the seal member.

SUMMARY OF THE INVENTION

As mentioned above, the present invention is made by taking the actual condition mentioned above into consideration, and an object of the present invention is to provide a drain mechanism of a fluid filter in which a heated fluid is not splashed on a worker at a time of discharging the fluid such as a time of exchanging an element, and can maintain a high reliability in sealing a drain hole for a long time period while inhibiting dusts or the like from being mixed from an external portion at a time of normal use.

Further, another object of the present invention is to provide a fluid filter having the drain mechanism mentioned above, a draining jig preferably used in the fluid filter and a preferable draining method of the fluid filter.

The invention will now be described following

[1] A drain mechanism of a fluid filter comprising a cap engaged with a case and having a drain hole;

a drain member detachably mounted to said cap from an outer side thereof and closing said drain hole;

a valve member provided in an inner side of said cap and closing said drain hole; and an elastic means for energizing said valve member in a direction of closing said drain hole.

[2] A drain mechanism of a fluid filter as mentioned in above [1], wherein a seal member is interposed between said cap and said drain member attached to said drain hole.

[3] A drain mechanism of a fluid filter as mentioned in above [1], wherein a closure of said drain hole achieved by said valve member is cancelled by displacing said valve member against the energizing force of said elastic means by means of a tubular draining jig inserted to said drain hole, in a state in which said drain member is detached from said cap.

[4] A drain mechanism of a fluid filter as mentioned in above [3], wherein a seal structure is interposed between said cap and said draining jig inserted to said drain hole.

[5] A drain mechanism of a fluid filter as mentioned in above [3], wherein said cap is provided with an engaged portion which an engaging portion provided in said draining jig is allowed to be engaged with and disengaged from.

[6] A fluid filter comprising:

a drain mechanism comprising a cap engaged with a case and having a drain hole, a drain member detachably mounted to said cap from an outer side thereof and closing said drain hole, a valve member provided in an inner side of said cap and closing said drain hole, and an elastic means for energizing said valve member in a direction of closing said drain hole; and a housing having said drain mechanism and constituted by said case and said cap.

[7] A fluid filter as mentioned in above [6], wherein a seal member is interposed between said cap and said drain member attached to said drain hole.

[8] A fluid filter as mentioned in above [6], wherein a closure of said drain hole achieved by said valve member is cancelled by displacing said valve member against the energizing force of said elastic means by means of a tubular draining jig inserted to said drain hole, in a state in which said drain member is detached from said cap.

[9] A fluid filter as mentioned in above [8], wherein a seal structure is interposed between said cap and said draining jig inserted to said drain hole.

[10] A fluid filter as mentioned in above [8], wherein said cap is provided with an engaged portion which an engaging portion provided in said draining jig is allowed to be engaged with and disengaged from.

[11] A draining jig used in a fluid filter comprising:

a drain mechanism comprising a cap engaged with a case and having a drain hole, a drain member detachably mounted to said cap from an outer side thereof and closing said drain hole, a valve member provided in an inner side of said cap and closing said drain hole, and an elastic means for energizing said valve member in a direction of closing said drain hole; and a housing having said drain mechanism and constituted by said case and said cap, wherein a drain passage of said draining jig is constituted by a center passage extending toward an axial direction of said draining jig, and a communication passage connected to said center passage and open to an outer periphery of said draining jig.

[12] A draining jig used in a fluid filter as mentioned in above [11], wherein said draining jig has a flange portion which is in contact with a seal member provided in a bottom portion of said cap.

[13] A draining jig used in a fluid filter as mentioned in above [11], wherein said draining jig has a connection portion capable of connecting to a fluid discharging hose.

[14] A draining jig used in a fluid filter as mentioned in above [11], wherein said draining jig is integrally provided with an attaching and detaching jig used for attaching and detaching said cap to and from said case.

[15] A draining method of a fluid filter comprising:

a drain mechanism comprising a cap engaged with a case and having a drain hole, a drain member detachably mounted to said cap from an outer side thereof and closing said drain hole, a valve member provided in an inner side of said cap and closing said drain hole, and an elastic means for energizing said valve member in a direction of closing said drain hole; and a housing having said drain mechanism and constituted by said case and said cap, wherein, said drain member is detached from said cap, and a closure of said drain hole by said drain member is cancelled, thereafter, a tubular draining jig is inserted to said drain hole, and said valve member is displaced against an energizing of said elastic means by said draining jig, thereby canceling a closure of said drain hole by said valve member, and discharging a fluid within a housing to an external portion via a drain passage provided in said draining jig.

[16] A draining method of a fluid filter as mentioned in above [15], wherein a seal member is interposed between said cap and said drain member attached to said drain hole.

[17] A draining method of a fluid filter as mentioned in above [15], wherein a seal structure is interposed between said cap and said draining jig inserted to said drain hole.

[18] A draining method of a fluid filter as mentioned in above [15], wherein said cap is provided with an engaged portion which an engaging portion provided in said draining jig is allowed to be engaged with and disengaged from.

In accordance with the drain mechanism of the fluid filter on the basis of the present invention, at a time of normally using the fluid filter, the drain hole is closed by the drain member. Further, the drain member is detached from the cap at a time of replacing the element or the like. At this time, the closure of the drain hole achieved by the drain member is cancelled, however, the drain hole is closed by the valve member energized by the elastic member. The closure of the drain hole achieved by the valve member is cancelled by inserting the drain jig to the drain hole from this state, and displacing the valve member against the energizing force of the elastic member by means of the draining jig, and the fluid within the housing is discharged to the external portion via the drain passage provided in the draining jig.

As mentioned above, at a time of replacing the element or the like, it is possible to discharge the fluid by using the tubular draining jig, and it is possible to inhibit the heated fluid from being splashed on the worker at this fluid discharging time. Further, since the drain hole is closed by the drain member at a time of normal use, it is possible to prevent the dusts or the like from making an intrusion into the inner portion of the cap, and it is possible to maintain a high sealing reliability of the drain hole for a long time period.

Further, in the case that the seal member is interposed between the cap and the drain member attached to the drain hole, it is possible to improve a reliability in sealing the drain hole achieved by the drain member.

Further, in the case that the closure of the drain hole achieved by the valve member is cancelled by displacing the valve member against the energizing force of the elastic means by means of the tubular draining jig inserted to the drain hole, in a state in which the drain member is detached from the cap, it is possible to discharge the fluid within the housing to the external portion via the drain passage provided in the draining jig.

Further, in the case that the seal structure is interposed between the cap and the draining jig inserted to the drain hole, it is possible to more securely prevent the fluid from flowing out to the external portion from the other portions than the drain passage at a time of discharging the fluid.

Further, in the case that the cap is provided with the engaged portion which the engaging portion provided in the draining jig can be engaged with and disengaged from, it is possible to fix and detach the draining jig to and from the cap, and it is possible to improve a workability at a time of discharging the fluid.

In accordance with the fluid filter on the basis of the present invention, at a time of replacing the element or the like, it is possible to discharge the fluid by employing the tubular draining jig, and it is possible to inhibit the heated fluid from being splashed on the worker at a time of discharging the fluid. Further, since the drain hole is closed by the drain member at a time of normal use, it is possible to prevent the dusts or the like from making an intrusion into the inner portion of the cap, and it is possible to maintain a high reliability of seal in the drain hole for a long time period.

In accordance with the draining jig used in the fluid filter on the basis of the present invention, it is possible to provide the draining jig preferably used in the fluid filter having the drain mechanism mentioned above. In other words, it is possible to smoothly discharge the fluid within the housing to the external portion via the center passage and the communication passage structuring the drain passage of the draining jig, at a time of discharging the fluid.

Further, in the case that the draining jig has the flange portion which is in contact with the seal member provided in the bottom portion of the cap, it is possible to more securely prevent the fluid from flowing out to the external portion from the other portions than the drain passage of the draining jig, at a time of discharging the fluid.

Further, in the case that the draining jig has the connection portion capable of connecting to the fluid discharging hose, it is possible to inhibit the workability from being deteriorated due to the scattering of the fluid at a time of discharging the fluid.

Further, in the case that the draining jig is integrally provided with the attaching and detaching jig used for attaching and detaching the cap to and from the case, it is possible to perform the fluid discharging work by means of the attaching and detaching jig, and it is possible to perform the attaching and detaching work between the case and the cap following the fluid discharging work.

In accordance with the draining method of the fluid filter on the basis of the present invention, it is possible to provide a preferable draining method of the fluid filter mentioned above. In other words, first, the drain member is detached from the cap, and the closure of the drain hole achieved by the drain member is cancelled. Thereafter, the tubular draining jig is inserted to the drain hole, and the valve member is displaced against the energizing of the elastic means by the draining jig, whereby it is possible to cancel the closure of the drain hole by the valve member, and it is possible to smoothly discharge the fluid within the housing to the external portion via the drain passage provided in the draining jig.

MODE FOR CARRYING OUT THE INVENTION

<Fluid Filter>

The "fluid filter" in accordance with the present mode is provided with a drain mechanism and a housing mentioned below. The fluid filter can be provided, for example, with a filter element received in the housing.

The "housing" mentioned above is not particularly limited in a structure, a shape, a material and the like thereof as far as it is constituted by a cap and a case which can be engaged and disengaged with each other. As an engaging and disengaging mechanism between the cap and the case, for example, there can be listed up (1) a screwing mechanism constituted by male and female screw portions which can be screwed with each other, (2) a bayonet mechanism constituted by a groove portion and a convex portion which can be engaged and disengaged with each other, and the like. Further, an inflow port for taking in a liquid from an external portion and an outflow port for delivering the liquid to the external portion are normally formed in the case.

<Drain Mechanism>

The "drain mechanism" in accordance with the present mode is provided with a cap, a drain member, a valve member and an elastic means mentioned below.

The "cap" mentioned above is not particularly limited in a structure, a shape, a material and the like thereof as far as it is engaged with the case mentioned above and has a drain hole. The cap can be provided, for example, with an engaged portion which an engaging portion of a draining jig mentioned below can be engaged to and disengaged from.

The "engaged portion" mentioned above is not particularly limited in a structure, a shape, a material and the like thereof as far as the engaging portion of the draining jig mentioned below can be engaged and disengaged. The engaged portion can be, for example, arranged in an inner side of the cap or arranged in an outer side of the cap. Further, the engaged portion can be, for example, integrally formed with the cap or formed by an independent member from the cap. Further, the engaged portion can be, for example, constituted by an elastically deformable structure.

The "drain member" mentioned above is not particularly limited in a structure, a shape, a material and the like thereof as far as it is detachably mounted to the cap mentioned above from an outer side thereof and can close the drain hole mentioned above. The drain member can, for example, have a plug portion in which a male screw capable of engaging with a female screw formed on an inner peripheral surface of the drain hole mentioned above is formed.

Further, in general, a seal member (for example, an O-ring or the like) can be provided between the drain member and the cap.

As an installing aspect of the "seal member" mentioned above, there can be listed up, for example, any one of or a combination of two or more of (1) an aspect that the seal member is interposed between the bottom portion of the cap mentioned above and the flange portion provided in the drain member, (2) an aspect that the seal member is interposed between the inner peripheral surface of the drain hole mentioned above and the outer peripheral surface of the drain member mentioned above (for example, an outer peripheral surface of the plug portion mentioned above, and the like), and the like.

Further, in general, the seal structure can be provided between the draining jig mentioned below inserted to the drain hole mentioned above and the cap mentioned above.

As the "seal structure" mentioned above, there can be listed up, for example, any one of or a combination of two or more of (1) a structure in which the seal member (for example, an O-ring or the like) is interposed between the bottom portion of the cap mentioned above and the flange portion provided in the drain member mentioned above, (2) a structure in which an outer peripheral surface of the draining jig is brought into contact with an inner peripheral surface of the drain hole, and (3) a structure in which the seal member is interposed between the inner peripheral surface of the drain hole and the outer peripheral surface of the drain member and the like.

In this case, the seal member used in this seal structure can be used, for example, as the seal member provided between the drain member and the cap.

The "valve member" mentioned above is not particularly limited in a structure, a shape, a material and the like thereof as far as it is provided in the inner side of the cap and can close the drain hole. The valve member can, for example, have a contact portion brought into contact with a valve seat portion (for example, a cap projection portion or the like) provided in the cap. Accordingly, the drain hole can be closed by bringing the contact portion of the valve member into contact with the valve seat portion of the cap. Further, the contact portion can seal the drain hole, for example, by being brought into direct contact with the valve seat portion of the cap and being brought indirect contact with the valve seat portion of the cap via the seal member.

The "elastic means" mentioned above is not particularly limited in a structure, a shape, a material and the like thereof as far as it can energize the valve member in a direction of closing the drain hole. As the elastic means, there can be listed up, for example, elastic members such as rubber and spring, buffer mechanism, and the like. As the spring, there can be listed up, for example, a coil spring, a conical spring, a leaf spring and the like. The elastic means can be, for example, arranged between an element support body (for example, a plate or the like) for supporting the filter element, and the valve member. Further, the elastic member can, for example, achieve a function of energizing the filter element and the element support body so as to support the filter element together with the element support body.

<Draining Jig>

The "draining jig" in accordance with the present embodiment is not particularly limited in a structure, a shape, a material and the like thereof as far as it is formed in a tubular shape and has the drain passage. The draining jig can, for example, have any one of or a combination of two or more of the engagement portion, the flange portion, the connection portion and the like mentioned below.

The "drain passage" mentioned above can be constituted, for example, by a center passage extending along an axial direction of the draining jig, and a communication passage connected to the center passage and open to an outer periphery of the draining jig. As the center passage, there can be listed up, for example, a center hole open to both end sides of the draining jig, a center hole open only to one end side of the draining jig, and the like. Further, as the communication passage mentioned above, there can be listed up, for example, a slit notched from an axial end side of the draining jig, a through hole formed on the outer periphery of the draining jig in a penetrating manner, and the like.

The "engaging portion" mentioned above is not particularly limited in a structure, a shape, a material and the like thereof as far as it can be engaged with and disengaged from the engaged portion of the cap mentioned above. The engaging portion is normally engaged with and disengaged from the engaged portion accompanying with the elastic deformation. Further, the engaging portion can be, for example, arranged in the axial end side of the draining jig or arranged at a predetermined position of the draining jig in an axial direction. Further, the engaging portion can be, for example, integrally formed with the draining jig, or formed by an independent member from the draining jig. Further, the engaging portion can be, for example, formed as an elastically deformable structure. In particular, it is preferable that the engaging portion is formed as a structure which can be elastically deformed by a communication passage (for example, a slit or the like) structuring the drain passage mentioned above.

The "flange portion" mentioned above is not particularly limited in a structure, a shape, a material and the like thereof as far as it can be brought into contact with the seal member provided in the bottom portion of the cap.

The "connection portion" mentioned above is not particularly limited in a structure, a shape, a material and the like thereof as far as it can be connected to the fluid discharging hose.

The draining jig mentioned above can be, for example, integrally provided with an attaching and detaching jig used for attaching and detaching the cap with respect to the case. The attaching and detaching jig can be, for example, formed as a tubular jig having an engagement portion which can be engaged with and disengaged from the engaged portion formed on the outer periphery of the cap. Further, the draining jig can be, for example, integrally formed with the attaching and detaching jig, or formed by an independent member from the attaching and detaching jig.

<Draining Method>

A draining method in accordance with the present mode first taking out the drain member from the cap and cancels the closure of the drain hole achieved by the drain member.

Thereafter, the draining jig is inserted to the drain hole, and the valve member is displaced against the energizing force of the elastic means by the draining jig. The closure of the drain hole achieved by the valve member is cancelled and the fluid within the housing is discharged to the external portion via the drain passage of the draining jig.

DESCRIPTION OF THE PREFERRED EMBODIMENT

A particular description will be given below of the present invention on the basis of an embodiment with reference to the accompanying drawings. In this case, in the present embodiment, an element replacement type filter is exemplified by an oil filter attached to a cylinder block (not shown) of an internal combustion engine.

(1) Structure of Oil Filter

Figure 1:
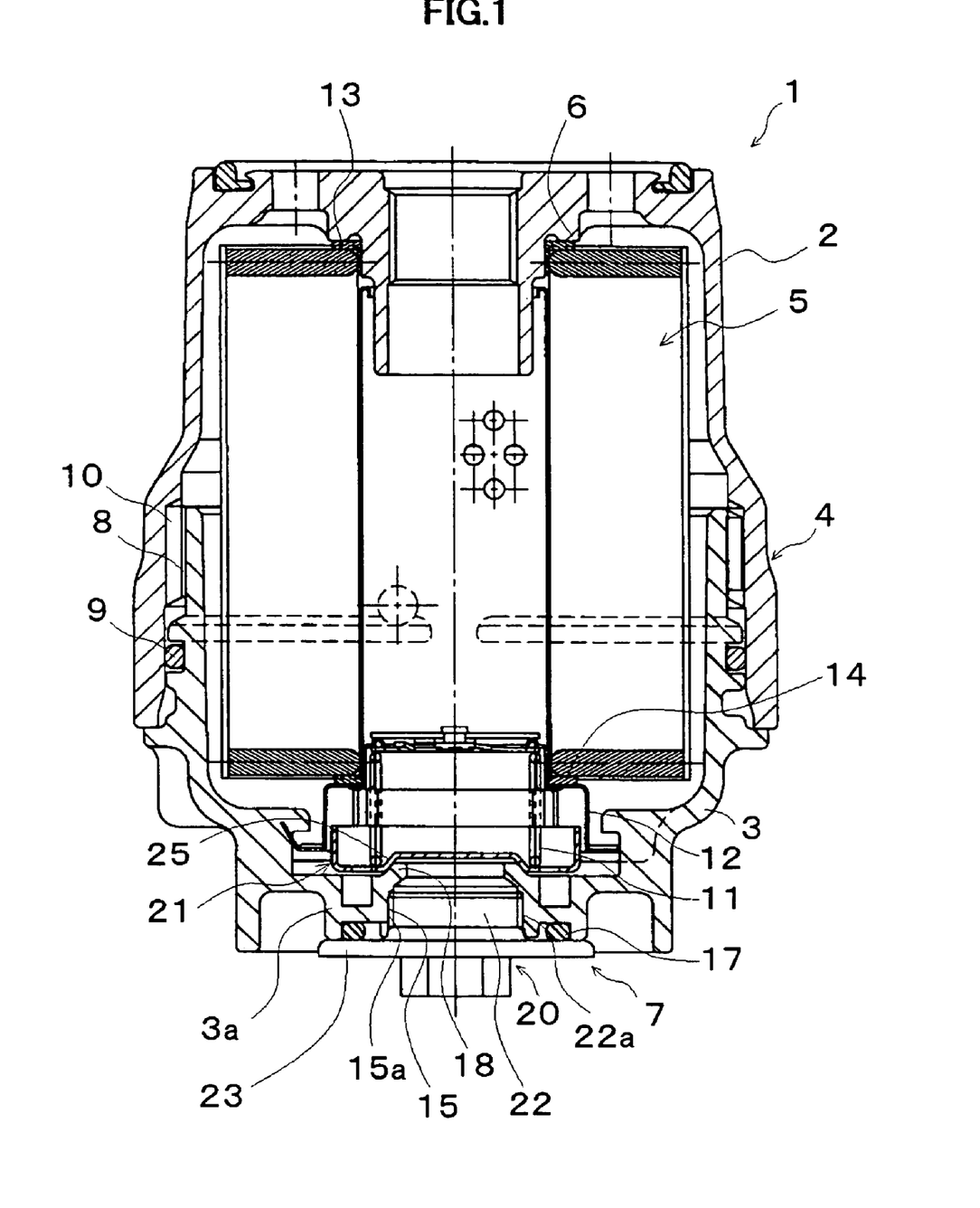
FIG. 1 is a cross sectional view showing an entire structure of an oil filter in accordance with the present embodiment in a used state.

An oil filter 1 in accordance with the present embodiment is basically provided, as shown in FIG. 1, with a housing 4 constituted by metal case 2 and cap 3 which can be engaged with and disengaged from each other, a filter element 5 received within the housing 4 and a drain mechanism 7.

A male screw portion 8 is formed on an outer peripheral surface of the cap 3, and an O-ring 9 is attached to the outer peripheral surface of the cap 3. A female screw portion 10 is formed on an inner peripheral surface of the case 2. When screwing the male screw portion 8 with the female screw portion 10 so as to engage the case 2 with the cap 3 via the O-ring 9, an inner portion of the housing 4 is sealed (held in a liquid tight manner). Upper and lower end portions of the filter element 5 are sealed by the plate 12 and the case projection portion 6 provided in the case 2 via the respective seal members 13 and 14 due to the energizing force of the spring 11, in the inner portion of the housing, and a filtration of the oil is carried out by the filter element 5.

A drain hole 15 having a female screw 15a formed in an inner periphery thereof is provided in a center of the bottom portion 3a in the cap 3. Further, an O-ring 17 (exemplified as a seal member) is attached to a lower end portion of the bottom portion 3a in the cap 3 so as to surround the drain hole 15. Further, an annular cap projection portion 18

(exemplified as an engaged portion) is provided in an upper end portion of the bottom portion 3a in the cap 3.

Figure 2:
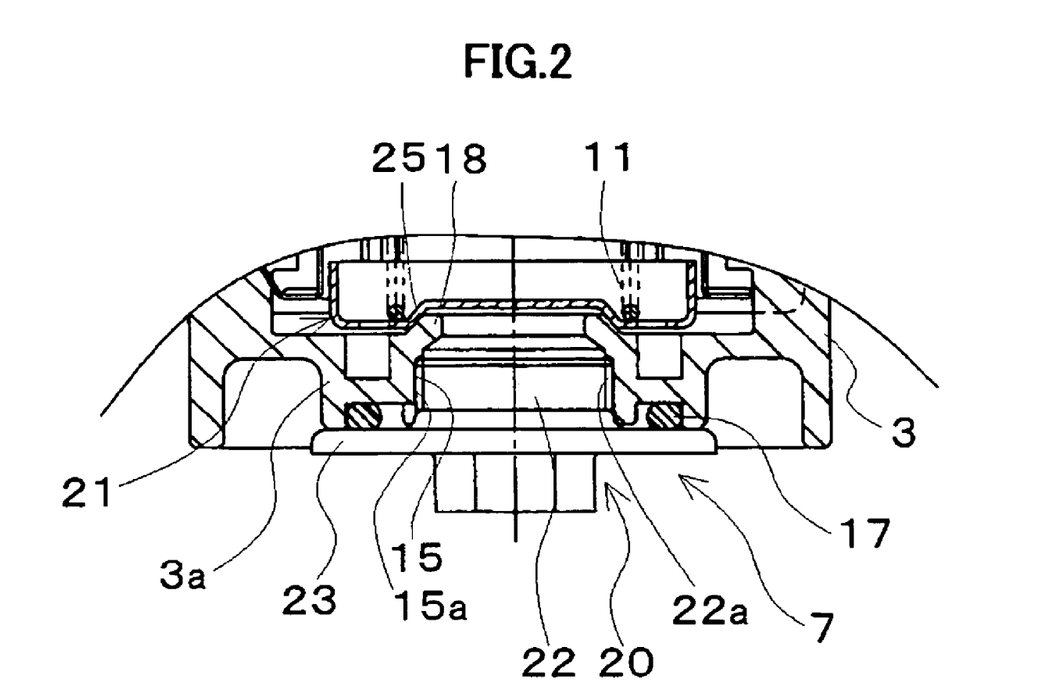
FIG. 2 is an enlarged view of a main portion in FIG. 1.

Next, a description will be given of the drain mechanism 7. The drain mechanism 7 is basically provided, as shown in FIGS. 1 and 2, with a metal drain bolt 20 (exemplified as a drain member), a metal valve member 21 and a spring 11 (exemplified as an elastic means). The drain bolt 20 has a plug portion 22 having a male screw 22a formed therein, and a flange portion 23 connected to a lower portion of the plug portion 22. Further, when engaging a male screw 22a of the drain bolt 20 with the female screw 15a of the drain hole 15 so as to screw the drain bolt 20 into the drain hole 15, the flange portion 23 of the drain bolt 20 is pressure contacted against the O-ring 17 and the drain hole 15 is sealed.

The valve member 21 is formed in a socket shape as a whole, and has a contact portion 25 brought into contact with an outer peripheral surface of the cap projection portion 18. The contact portion 25 of the valve member 21 is normally brought into contact with the cap projection portion 18 on the basis of the energizing force of the spring 11, and the drain hole 15 is sealed by metal. Accordingly, even in a state in which the drain bolt 20 is detached from the drain hole 15, only a small amount of residual oil within the housing 4 is flowed out to the outer portion from the drain hole 15.

(2) Structure of Draining Jig

Figure 3:
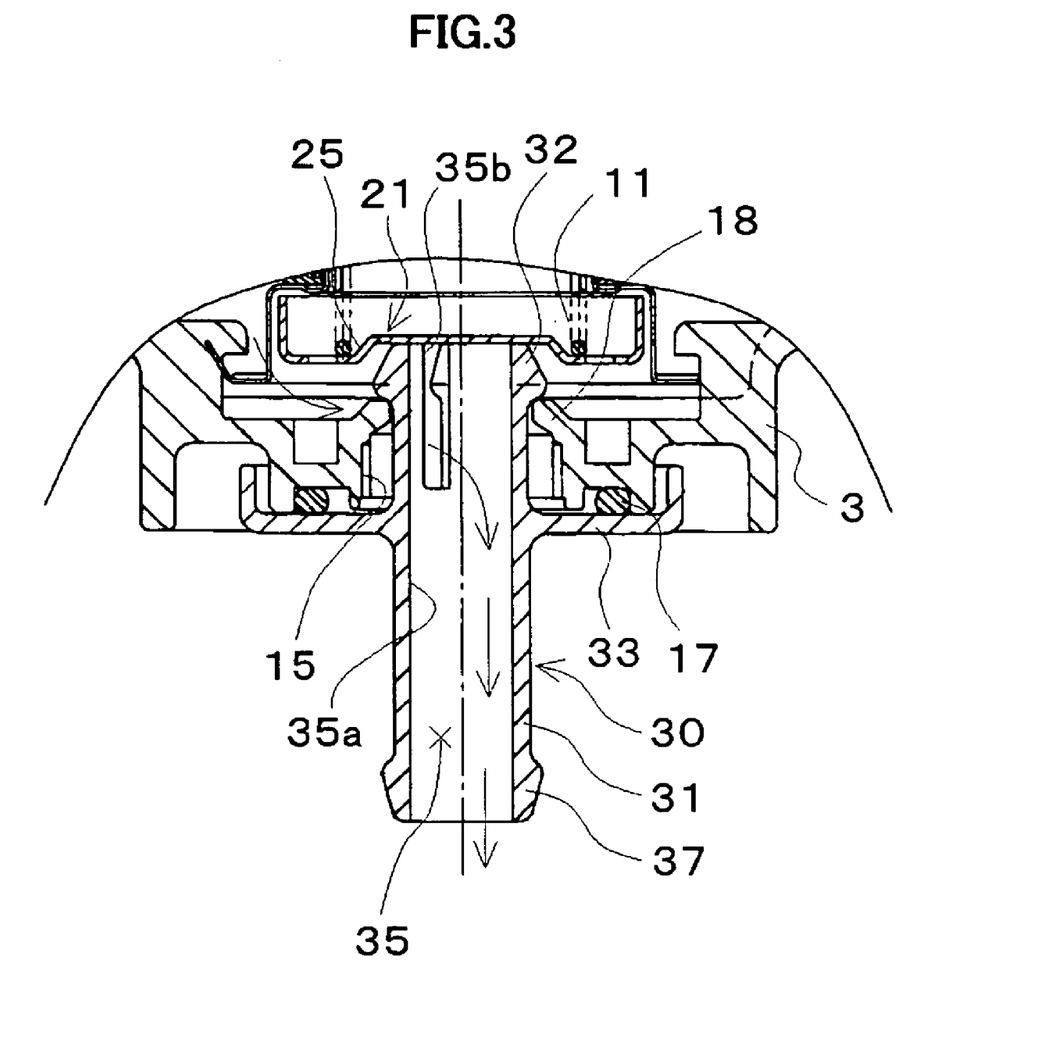
FIG. 3 is an enlarged cross sectional view of a main portion of an oil filter in an oil discharging state.

Next, a description will be given of the draining jig 30. The draining jig 30 is made of a synthetic resin and is formed in a tubular shape as a whole, as shown in FIG. 3. The draining jig 30 has a pipe-shaped portion 31 having both ends opened, an engaging portion 32 provided in an upper end portion of the pipe-shaped portion 31 and having an outward bulged shape, and a socket-shaped flange portion 33 provided in an intermediate portion of the pipe-shaped portion 31.

In the pipe-shaped portion 31, there is formed a drain passage 35 constituted by a center hole 35a (exemplified as a center passage), and a plurality of slits 35b (exemplified as a communication passage) notched from an upper end of the center hole 35a toward a lower side. Further, the engaging portion 32 can be engaged with and disengaged from the cap projection portion 18 accompanying with an elastic deformation generated by the slits 35b, and can fix the draining jig 30 to the cap 3 and cancel the fixing. Further, the flange portion 33 of the draining jig 30 is pressure contacted with the O-ring 17 of the cap 3 so as to be sealed, under a state in which the draining jig 30 is fixed to the cap 3 (refer to FIG. 3).

(3) Operation of Oil Filter

Next, a description will be given of an operation of the oil filter 1. At a time when the oil filter 1 is normally used, the drain bolt 20 is mounted to the drain hole 15 of the cap 3 via the O-ring 17, and the drain hole 15 is sealed.

Further, at a time of replacing the filter element 5, the O-rings 9 and 17 and the like, the worker first loosens the drain bolt 20 and detaches the drain bolt 20 from the drain hole 15. At this time, since the contact portion 25 of the valve member 21 is brought into contact with the cap projection portion 18 on the basis of the energizing force of the spring 11 so as to be sealed by metal seal, the residual oil within the housing 4 does not flow out to the outer portion from the drain hole 15.

Thereafter, the worker inserts the draining jig 30 to the drain hole 15, and pushes up the valve member 21 by the upper end surface of the engaging portion 32 against the energizing force of the spring 11. Accordingly, the seal of the drain hole 15 achieved by the valve member 21 is cancelled, and the residual oil within the housing 4 is discharged to the outer portion via the slits 35b and the center hole 35a in the draining jig 30. In this case, the engaging portion 32 of the draining jig 30 is engaged with the cap projection portion 18 by inserting the draining jig 30 to the drain hole 15 accompanying with the elastic deformation, and the draining jig 30 is fixed to the cap 3. Further, in this fixed state, the flange portion 33 of the draining jig 30 is pressure contacted with the O-ring 17 provided in the bottom portion 3a of the cap 3 (refer to FIG. 3).

Thereafter, the worker pulls out the cap 3 from the draining jig 30 at a time when the residual oil within the housing 4 is discharged, and loosens the cap 3 by using an attaching and detaching jig (not shown) so as to separate the cap 3 from the case 2, whereby a replacing work of the filter element 5, the O-rings 9 and 17 and the like is performed.

(4) Effect of Embodiments

As mentioned above, in accordance with the present embodiments, since the drain bolt 20 is screwed with the drain hole 15 and the drain hole 15 is completely closed at a time when the oil filter 1 is normally used, the dusts such as the sediment, the mud and the like are not mixed into the inner portion of the housing 4 via the drain hole 15 from the external portion, and it is possible to maintain a high sealing reliability of the O-ring 17 for a long time period. Further, at a time of replacing the element, since the residual oil is discharged by using the draining jig 30 prior to the separating work between the case 2 and the cap 3, it is possible to prevent the heated oil from being splashed on the worker at a time of discharging the oil.

Further, in accordance with the present embodiment, since the draining jig 30 can be fixed to the cap 3 and cancelled the fixing on the basis of the attaching and detaching work between the engaging portion 32 of the draining jig 30 and the cap projection portion 18, it is possible to fix the draining jig 30 to the cap 3 at a time of discharging the oil, and it is possible to improve a workability thereof.

Further, in accordance with the present embodiment, since the flange portion 33 of the draining jig 30 is pressure contacted with the O-ring 17 of the cap 3 so as to seal, in a state in which the draining jig 30 is fixed to the cap 3, it is possible to more securely prevent the fluid from flowing out to the outer portion from the other portions than the drain passage 35 of the draining jig 30 at a time of discharging the oil.

In this case, the present invention is not limited to the embodiments mentioned above, and can be applied to variously modified embodiments within the scope of the present invention in correspondence to various objects and applications. In other words, in the embodiments mentioned above, the structure is made such that the oil is discharged to the oil receiving plate or the like placed below the draining jig 30 from the lower end opening of the draining jig 30, however, the structure is not limited to this. For example, the structure is made such that a connection portion 37 (refer to FIG. 3) having an outward bulged shape and provided in the lower end portion of the draining jig 30 is connected to one end of an oil discharging hose (not shown), and the oil is discharged via the hose. Accordingly, it is possible to prevent the oil from being scattered at a time of discharging the oil.

Figure 4:
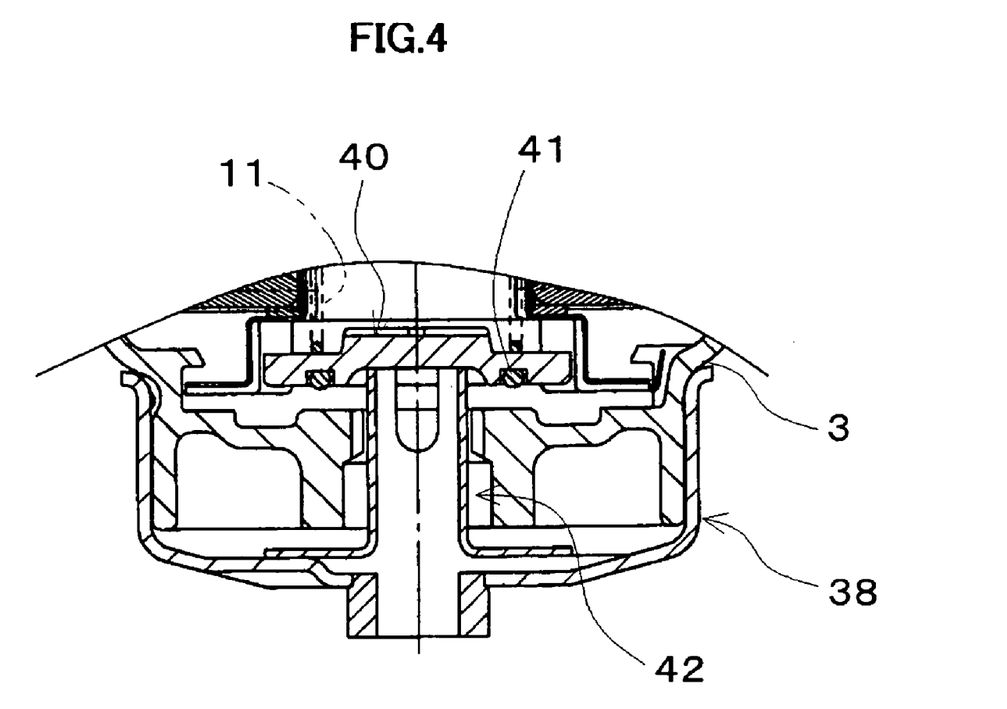
FIG. 4 is an enlarged cross sectional view of a main portion for explaining the other aspect of a draining jig.

Further, in the embodiments mentioned above, the draining jig 30 is exemplified as a jig having an exclusive use of draining, however, the structure is not limited to this. For example, as shown in FIG. 4, the structure may be made such that a draining jig 42 is integrally provided in an attaching and detaching jig 38 for attaching and detaching the cap 3 with respect to the case 2 so as to structure the draining jig. Accordingly, it is possible to discharge the oil and the separate the cap 3 from the case in accordance with a series of works.

Further, in the embodiment mentioned above, the metal seal caused by the contact between the contact portion 25 of the valve member 21 and the cap projection portion 18 is employed, however, the structure is not limited to this. For example, as shown in FIG. 4, an internal seal may be achieved by an O-ring 41 attached to the valve member 40.

What is claimed is:

1. A drain mechanism of a fluid filter comprising:
a cap engaged with a case and having a drain hole;
a drain member detachably mounted to said cap from an outer side thereof and closing said drain hole;
a valve member provided in an inner side of said cap and closing said drain hole; and
an elastic means for energizing said valve member in a direction of closing said drain hole;
wherein a closure of said drain hole achieved by said valve member is cancelled by displacing said valve member against the energizing force of said elastic means by means of a tubular draining jig having an axial end inserted to said drain hole, in a state in which said drain member is detached from said cap,
a plurality of slits notched from the axial end of said draining jig and an engaging portion having an outward bulged shape are provided in the axial end of said draining jig,
an engaged portion which said engaging portion is allowed to be engaged with and disengaged from with an elastic deformation generated by said slits is provided in an inner side of said cap, wherein said engaged portion does not move with said valve member, and
a seal member attached to a bottom portion of said cap so as to surround said drain hole, wherein said drain member has a flange portion which is in contact with said seal member in a state in which said drain member is mounted to said cap.

2. A drain mechanism of a fluid filter as claimed in claim 1, wherein a seal structure is interposed between said cap and said draining jig inserted to said drain hole.

3. A drain mechanism of a fluid filter as recited in claim 1, wherein said draining jig has a flange portion which is in contact with said seal member in a state in which said draining jig is mounted to said cap.

4. A fluid filter comprising:
a drain mechanism comprising a cap engaged with a case and having a drain hole, a drain member detachably mounted to said cap from an outer side thereof and closing said drain hole, a valve member provided in an inner side of said cap and closing said drain hole, and an elastic means for energizing said valve member in a direction of closing said drain hole; and
a housing having said drain mechanism and constituted by said case and said cap;
wherein a closure of said drain hole achieved by said valve member is cancelled by displacing said valve member against the energizing force of said elastic means by means of a tubular draining jig having an axial end inserted to said drain hole, in a state in which said drain member is detached from said cap,
a plurality of slits notched from the axial end of said draining jig and an engaging portion having an outward bulged shape are provided in the axial end of said draining jig,
an engaged portion which said engaging portion is allowed to be engaged with and disengaged from with an elastic deformation generated by said slits is provided in an inner side of said cap, wherein said engaged portion does not move with said valve member, and
a seal member attached to a bottom portion of said cap so as to surround said drain hole, wherein said drain member has a flange portion which is in contact with said seal member in a state in which said drain member is mounted to said cap.

5. A fluid filter as claimed in claim 4, wherein a seal structure is interposed between said cap and said draining jig inserted to said drain hole.

6. A draining jig used in a fluid filter comprising:
a drain mechanism comprising a cap engaged with a case and having a drain hole, a drain member detachably mounted to said cap from an outer side thereof and closing said drain hole, a valve member provided in an inner side of said cap and closing said drain hole, and an elastic means for energizing said valve member in a direction of closing said drain hole; and
a housing having said drain mechanism and constituted by said case and said cap,
a seal member attached to a bottom portion of said cap so as to surround said drain hole, wherein said drain member has a flange portion which is in contact with said seal member in a state in which said drain member is mounted to said cap,
wherein said draining jig is a tubular draining jig having an axial end which is inserted to said drain hole, in a state in which said drain member is detached from said cap, and is for displacing said valve member against the energizing force of said elastic means to cancel a closure of said drain hole achieved by said valve member,
a plurality of slits notched from the axial end of said draining jig and an engaging portion having an outward bulged shape are provided in the axial end of said draining jig, and said engaging portion is allowed to engage with and disengaged from an engaged portion providing in an inner side of said cap with an elastic deformation generated by said slits, wherein said engaged portion does not move with said valve member, and
a drain passage of said draining jig is constituted by a center passage extending toward an axial direction of said draining jig, and said slits connected to said center passage and open to an outer periphery of said draining jig.

7. A draining jig used in a fluid filter as claimed in claim 6, wherein said draining jig has a flange portion which is in contact with said seal member in a state in which draining jig is mounted to said cap.

8. A draining jig used in a fluid filter as claimed in claim 6, wherein said draining jig has a connection portion capable of connecting to a fluid discharging hose.

9. A draining jig used in a fluid filter as claimed in claim 6, wherein said draining jig is integrally provided with an attaching and detaching jig used for attaching and detaching said cap to and from said case.

10. A draining method of a fluid filter comprising:
a drain mechanism comprising a cap engaged with a case and having a drain hole, a drain member detachably mounted to said cap from an outer side thereof and closing said drain hole, a valve member provided in an inner side of said cap and closing said drain hole, and an elastic means for energizing said valve member in a direction of closing said drain hole; and a housing having said drain mechanism and constituted by said case and said cap, a seal member attached to a bottom portion of said cap so as to surround said drain hole, wherein said drain member has a flange portion which is in contact with said seal member in a state in which said drain member is mounted to said cap, wherein, said drain member is detached from said cap, and a closure of said drain hole by said drain member is cancelled, thereafter, an axial end of a tubular draining jig is inserted to said drain hole, and said valve member is displaced against an energizing of said elastic means by said draining jig, thereby canceling a closure of said drain hole by said valve member, and an engaging portion having an outward bulged shape providing in the axial end of said draining jig is engaged with an engaged portion providing in an inner side of said cap with the elastic deformation generated by a plurality of slits notched from the axial end of said draining jig, and discharging a fluid within a housing to an external portion via a drain passage provided in said draining jig, wherein said engaged portion does not move with said valve member.

11. A draining method of a fluid filter as claimed in claim 10, wherein a seal structure is interposed between said cap and said draining jig inserted to said drain hole.

12. A drain mechanism of a fluid filter comprising:

a cap engaged with a case and having a drain hole, including an engaged portion provided in an inner side of said cap;

a drain member detachably mounted to said cap from an outer side thereof and closing said drain hole;

a valve member provided in an inner side of said cap and closing said drain hole, wherein said engaged portion does not move with said valve member;

an elastic means for energizing said valve member in a direction of closing said drain hole; and a tubular draining jig insertable to said drain hole, in a state in which said drain member is detached from said cap, said tubular draining jig comprising a plurality of slits notched from an axial end side of said draining jig and an engaging portion having an outward bulged shape provided in an axial end side of said draining jig; and a seal member attached to a bottom portion of said cap so as to surround said drain hole, wherein said drain member has a flange portion which is in contact with said seal member in a state in which said drain member is mounted to said cap, wherein said engaging portion and said engaged portion are arranged such that the insertion of said tubular draining jig into said drain hole, in a state in which said drain member is detached from said cap, cancels a closure of said drain hole by said valve member by displacing said valve member against the energizing force of said elastic means.

13. A drain mechanism of a fluid filter as recited in claim 12, wherein said draining jig has a flange portion which is in contact with said seal member in a state in which said draining jig is mounted to said cap.

* * * * *